(12) United States Patent
Bayless et al.

(10) Patent No.: US 12,181,377 B2
(45) Date of Patent: *Dec. 31, 2024

(54) SYSTEM AND METHOD FOR MONITORING SETTLING OF A BUILDING

(71) Applicant: Independence Materials Group, LLC, Virginia Beach, VA (US)

(72) Inventors: Ben Bayless, Decatur, AL (US); Andy Burran, Chickamauga, GA (US); John Calagaz, Mobile, AL (US); Michael Cox, Soddy Daisy, TN (US)

(73) Assignee: Independence Materials Group, LLC, Virginia Beach, VA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/110,628

(22) Filed: Feb. 16, 2023

(65) Prior Publication Data
US 2023/0204452 A1  Jun. 29, 2023

Related U.S. Application Data

(63) Continuation of application No. 17/229,713, filed on Apr. 13, 2021, now Pat. No. 11,604,114.

(60) Provisional application No. 63/008,957, filed on Apr. 13, 2020, provisional application No. 63/009,202, filed on Apr. 13, 2020.

(51) Int. Cl.
| G08B 21/00 | (2006.01) |
| G01M 5/00 | (2006.01) |
| G08B 21/18 | (2006.01) |
| G08B 21/20 | (2006.01) |

(52) U.S. Cl.
CPC .......... G01M 5/005 (2013.01); G01M 5/0091 (2013.01); G08B 21/182 (2013.01); G08B 21/20 (2013.01)

(58) Field of Classification Search
CPC .. G01M 5/005; G01M 5/0091; G01M 5/0041; G08B 21/182; G08B 21/20
USPC ...................................................... 340/686.6
See application file for complete search history.

(56) References Cited

U.S. PATENT DOCUMENTS

| 6,157,307 A | 12/2000 | Hardin |
| 9,672,717 B1 | 6/2017 | Slavin et al. |
| 9,709,431 B1 | 7/2017 | Kinney et al. |
| 9,989,397 B1 | 6/2018 | Kinney et al. |
| 10,042,341 B1 | 8/2018 | Jacob |

(Continued)

FOREIGN PATENT DOCUMENTS

WO    WO-0197497 A2 * 12/2001  ............ H04L 43/00

*Primary Examiner* — Mark S Rushing
(74) *Attorney, Agent, or Firm* — Moore & Van Allen PLLC; Jeffrey R. Gray

(57) ABSTRACT

A system and method for monitoring conditions in a crawl space is provided. The system generally comprises at least one sensor, computing device, data aggregator operably connected to the at least one sensor, processor operably connected to the computing device, power supply, and non-transitory computer-readable medium coupled to the processor and having instructions stored thereon. The system is designed to collect condition data via the at least one sensor and determine whether the conditions within the crawl space could have a detrimental impact on the building. In particular, the system is designed to monitor settling of a building over time and alert a user if the settling exceeds a predefined threshold.

20 Claims, 7 Drawing Sheets

(56) References Cited

U.S. PATENT DOCUMENTS

| | | |
|---|---|---|
| 10,481,574 B2 | 11/2019 | Wiens-Kind et al. |
| 10,497,250 B1 | 12/2019 | Hayward et al. |
| 11,054,342 B2 | 7/2021 | Courtney et al. |
| 11,087,420 B1 | 8/2021 | Trundle |
| 2006/0037392 A1* | 2/2006 | Carkner .............. G01F 23/2962 |
| | | 73/290 V |
| 2008/0124175 A1 | 5/2008 | Riste |
| 2011/0146582 A1 | 6/2011 | Lemmon et al. |
| 2012/0197555 A1* | 8/2012 | Cheng ..................... G01F 23/02 |
| | | 73/290 V |
| 2013/0241727 A1 | 9/2013 | Coulombe |
| 2014/0197944 A1 | 7/2014 | Felgate et al. |
| 2015/0100167 A1* | 4/2015 | Sloo ....................... G08B 29/22 |
| | | 700/278 |
| 2017/0297866 A1* | 10/2017 | Fauconnet ............ B66B 5/0087 |
| 2017/0370369 A1* | 12/2017 | Grzeika .................. G01F 25/22 |
| 2019/0120234 A1 | 4/2019 | Correia |
| 2019/0323507 A1 | 10/2019 | Wilkerson |
| 2019/0333233 A1 | 10/2019 | Hu et al. |
| 2020/0018665 A1* | 1/2020 | Ostashev ................. G08B 3/10 |
| 2020/0209041 A1 | 7/2020 | Breitenfeldt et al. |
| 2020/0219375 A1 | 7/2020 | Peros |
| 2020/0240418 A1 | 7/2020 | Correia |
| 2020/0387127 A1 | 12/2020 | McGill et al. |
| 2021/0309539 A1 | 10/2021 | Kutney et al. |
| 2021/0312789 A1 | 10/2021 | Linn |
| 2021/0340740 A1 | 11/2021 | Kochan, Jr. |
| 2021/0366062 A1 | 11/2021 | Trundle |
| 2022/0136886 A1 | 5/2022 | Dyer |
| 2022/0318896 A1 | 10/2022 | Stanovnov et al. |
| 2022/0366507 A1 | 11/2022 | Linn |
| 2023/0035517 A1 | 2/2023 | Bentley, III et al. |

* cited by examiner

SYSTEM AND METHOD FOR MONITORING SETTLING OF A BUILDING

CROSS REFERENCES

This application claims the benefit of co-pending U.S. patent application Ser. No. 17/229,713 filed on Apr. 13, 2021, which claims the benefit of U.S. Provisional Application No. 63/008,957 and U.S. Provisional Application No. 63/009,202, both of which were filed on Apr. 13, 2020, wherein each of which are assigned to the assignee hereof and all of which are herein incorporated by reference.

FIELD OF THE DISCLOSURE

The subject matter of the present disclosure refers generally to a system and method for monitoring conditions within the crawl space of a building.

BACKGROUND

All buildings settle over time after construction. However, if too much settling occurs, major structural problems may result. For instance, a settling foundation may cause doors to jam, cracks to form on walls, gaps to appear between windows, water pipes to burst, and floors to slant. And there is no way to estimate the cost to repair damage caused by a settling foundation until the cause of the settling foundation is known. All too often excessive settling isn't discovered until serious damage has already occurred, and repairing extensive damage caused by a settling foundation can easily cost upwards of $10,000. To make matters worse, many homeowners insurance policies exclude damage caused by a settling foundation, meaning the homeowner must pay for the entire cost of repair out of their own pocket. Because of this, it's important that settling issues are discovered as the problem presents in order to minimize damage and mitigate the cost to repair the settling issue.

In addition to settling concerns, all buildings also have a certain amount of humidity and/or standing water within the crawl space. If left unchecked, standing water and humidity may cause serious problems within the crawl space if the levels become too high. For instance, high humidity and/or standing water levels within a crawl space may attract certain types of pests that can cause damage to a building foundation or subfloor structure. High humidity and/or standing water may also result in mold growth, which may further weaken the subfloor structure over time if not addressed. Furthermore, certain types of toxic molds are known to cause serious health problems to certain individuals when exposed and can be quite costly to remove, requiring specialized equipment and evacuation of the building until remediation is completed. This means it very important to ensure that the humidity levels and/or standing water levels within the crawl space of a building be kept within acceptable limits at all times.

Therefore, there is a need in the art for a system and method that tracks the conditions in the crawl space of a building in order to prevent costly problems before they occur.

DESCRIPTION

A system and method for monitoring conditions within the non-main building expanse of a building is provided. In one aspect, the system allows users to determine when an unfavorable condition has developed in an auxiliary building expanse. In another aspect, the system warns a user of the system when an unfavorable condition within an auxiliary building expanse has developed. Generally, the system obtains condition data from various sensors within the auxiliary building expanse and compares that condition data to condition thresholds of the system in order to determine if a particular condition within the auxiliary building expanse is outside of an acceptable range. The system comprises at least one sensor, computing entity, data aggregator operably connected to the at least one sensor, processor operably connected to the computing entity, power supply, and non-transitory computer-readable medium coupled to the processor and having instructions stored thereon. The processor is configured to receive condition data and then use this information to determine when an unfavorable condition has occurred. The computing entity may comprise a user interface that may allow a user to view data of the system and/or cause the system to perform an action via commands input by said user. A database may be used to store condition data and building data gathered by the system. A wireless communication interface may allow the processor to receive audio data in the form of radio waves or as digital data.

The system is designed to collect condition data of an auxiliary building expanse and save said data within building profiles so that a user may monitor the conditions within said auxiliary building expanse. In particular, the system is designed to monitor settling of a building over that may result in significant structural damage if the cause of said settling is not corrected. The at least one sensor may be secured within the auxiliary building expanse in a way such that it may measure conditions of the auxiliary building expanse and transmit condition data to the processor. The at least one sensor may be configured to measure a variety of types of condition data and transmit that data to the processor. Types of sensors that may be connected to the data aggregator or the computing entity may include, but are not limited to, thermometer, hygrometer, gas detector, microphone, vibration sensor, current sensor, ultrasonic sensor, infrared sensor, microwave sensor, photoelectric sensor, time-of-flight sensor, or any combination thereof.

A time-of-flight sensor having a reflective material may be used to acquire distance data for the system. The distance determined by the time-of-flight sensor may be used by the system to determine the settling of a building, depending on the positioning of the time-of-flight sensor and reflective material within the crawl space. The time-of-flight sensor may be attached to a beam within the crawl space and angled in a way such that any light emitted from the illumination cone of the time-of-flight sensor may be received by the view cone of the time-of-flight sensor. The reflective material may be secured to the ground within the crawl space in a way such that the building moves over time relative the reflective material while the reflective material remains in the same position. The system may comprise multiple time-of-flight sensors attached at various points within the crawl space to measure settling in different areas of a building. For instance, a building may have four time-of-flight sensors measuring settling data at various locations within the crawl space to determine uneven settling of a building.

The system may also comprise a sump pump connected configured to transmit data to the computing entity. An electrical current sensor may allow the system to determine when the sump pump is pulling an electrical current, which is then relayed to the computing entity. This may allow a user to determine when the sump pump is running, indicating water in the floor area of the auxiliary building expanse.

The system may also determine when the sump pump is malfunctioning based on the amount of current pulled from the data aggregator. For instance, a sump pump pumping water will pull more current than a sump pump that is dry running. In another embodiment, the time of flight sensor or sump pump may be configured to determine the amount of standing water within an auxiliary building expanse. This water level data may then be transmitted to the processor and/or computing entity to determine how much water the sump pump has removed from the auxiliary building expanse over time. The system may use water level data and sump pump data regarding electrical current to determine when a sump pump is malfunctioning. For instance, if the system determines that the sump pump is pulling current but not lowering the water level, the system may alert the user that the sump pump within the auxiliary building expanse may have a clogged or frozen discharge line or a jammed float switch.

Condition data of the system may be saved within a building profile, which may be viewed within the user interface of the system. The system may compare the condition data to condition thresholds of the system, wherein said condition threshold is the maximum/minimum value a particular category of condition data may exist before triggering a warning within the system for a particular auxiliary building expanse of a building. Condition thresholds may be automatically generated by the system or input by a user. A computing entity may be implemented in a number of different forms, including, but not limited to, servers, multipurpose computers, mobile computers, etc. Additionally, a computing entity may be made up of a single computer or multiple computers working together over a network, which may communicate via a wired or wireless connection. The user interface of the computing entity may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system may present data of the user interface to the user via a display operably connected to the processor.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system for monitoring conditions within an auxiliary building expanse.

Figure 1:
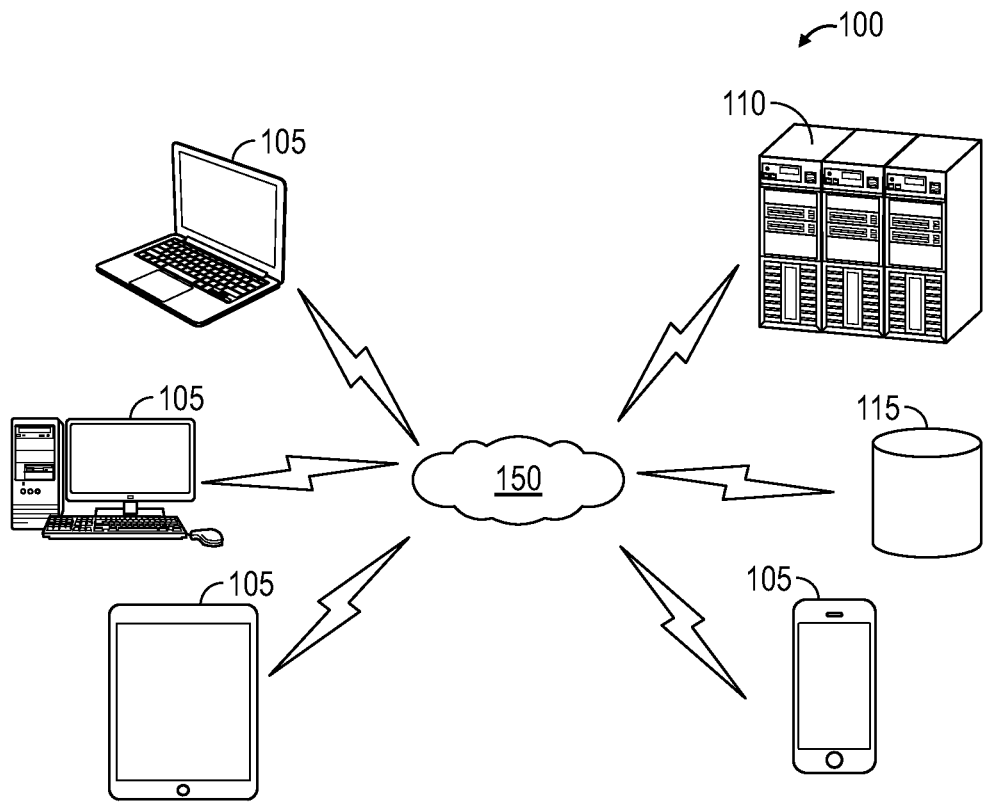
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a streaming device, a "smart" television, a personal digital assistant (PDA), a laptop, a smart phone, a tablet computer, or another type of computation or communication interface 280. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages to users 405, wherein a provided webpage may include a reference to a web server at which the desired information and/or links are located. The references to the web server at which the desired information is located may be included in a frame and/or text box, or as a link to the desired information/document.

Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages to clients 105. For instance, the webpages may be HTML-based webpages. A web server may host one or more websites. As used herein, a website may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
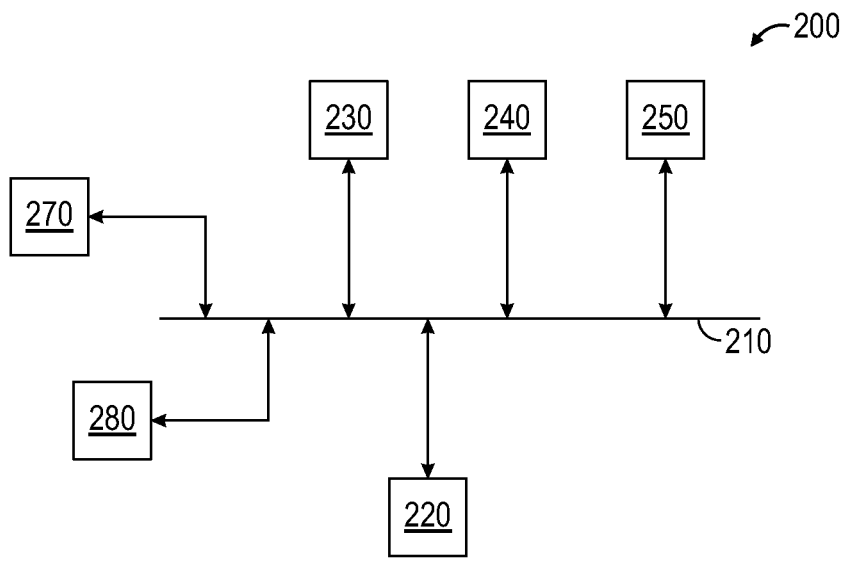
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280 (such as wired or wireless communication device). The bus 210 may be defined as one or more conductors that permit communication among the components of the computing entity 200. The processor 220 may be defined as logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of processor or microprocessor suitable for interpreting and executing computer readable instructions. The processor 220 is configured to perform the operations disclosed herein based on instructions stored within the system 400. The processor 220 may process instructions for execution within computing device 350, including instructions stored in memory or on a storage device, to display graphical information for a graphical user interface 411 (GUI) on an external input/output device, such as a display 316. The processor 220 may provide for coordination of the other components of a computing device 350, such as control of user interfaces 411, applications run by a computing device 350, and wireless communication by a communication device of the computing device 350. In some embodiments, the processor 220 may have a memory device therein or coupled thereto suitable for storing condition data 430B, building data 430A, or other information or material disclosed herein. In some instances, the processor 220 may be a component of a larger computing device 350. A computing device 350 that may house the processor 220 therein may include, but are not limited to, laptops, desktops, workstations, personal digital assistants, servers 110, databases 115, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers 110, databases 115, mainframes, cellular telephones, tablet computers, or any other similar device.

Memory 304 stores information within the computing device 300. In some preferred embodiments, memory 304 may include one or more volatile memory units. In another preferred embodiment, memory 304 may include one or more non-volatile memory units. Memory 304 may also include another form of computer-readable medium, such as a magnetic, solid state, or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device 408 and/or an output device 408. As used herein, an input device 408 may be defined as a device that allows a user 405 to input data and instructions that is then converted into a pattern of electrical signals in binary code that are comprehensible to a computing entity 200. An input device 408 of the peripheral device 270 may include one or more conventional devices that permit a user 405 to input information into the computing entity 200, such as a controller, scanner, phone, camera, scanning device, keyboard, a mouse, a pen, voice recognition and/or biometric mechanisms, etc. As used herein, an output device 408 may be defined as a device that translates the electronic signals received from a computing entity 200 into a form intelligible to the user 405. An output device 408 of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a smart watch may transfer data to a smartphone, wherein the smartphone may use that data in a manner separate from the smart watch.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
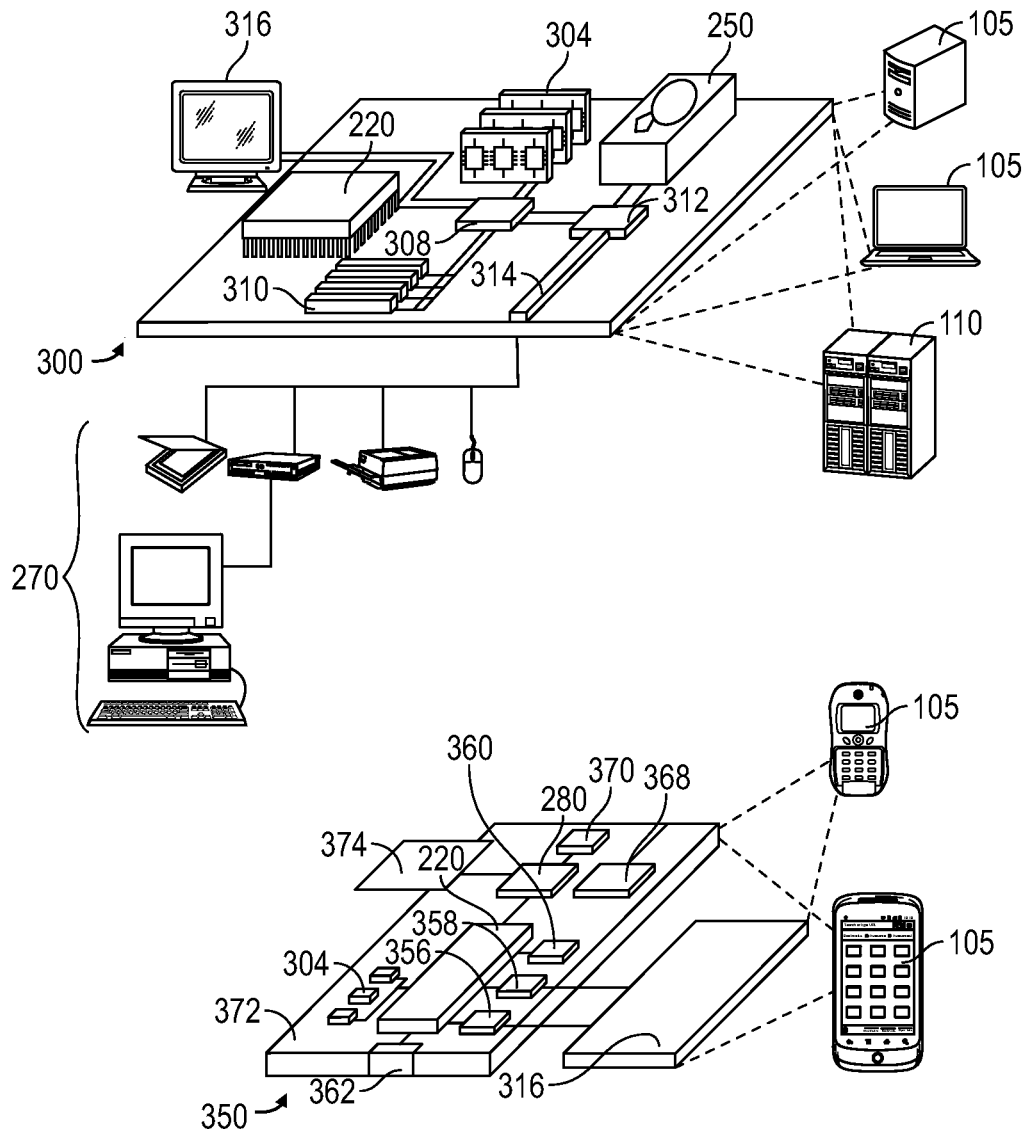
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers 110, databases 115, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350. Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device 408, such as a display 316 coupled to the high-speed interface 308. In other implementations, multiple processors and/or multiple buses may be used, as appropriate, along with multiple memory units and/or multiple types of memory. Additionally, multiple computing devices 300 may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 410, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation- and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may comprise a power supply 520. The power supply 520 may be any source of power that provides the system 400 with electricity. In one preferred embodiment, the system 400 may comprise a plurality of power supplies 520 that may provide power to the system 400 in different circumstances. For instance, the system 400 may be directly plugged into a stationary power outlet, which may provide power to the system 400 so long as it remains in one place. However, the system 400 may also be connected to a battery so that the system 400 may receive power even when it is not connected to a stationary power outlet. In this way, the system 400 may always receive power so that it may continuously update condition data 430B and provide users 405 with continuously updated conditions of the auxiliary building expanse.

Figure 4:
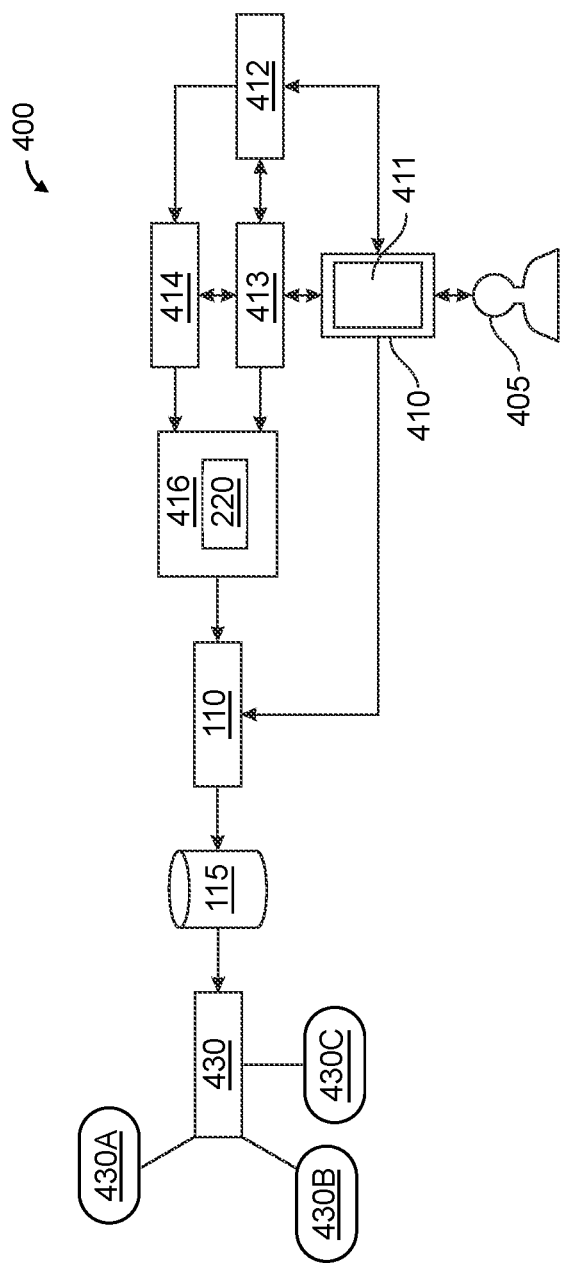
FIG. 4 is a diagram illustrating a system embodying features consistent with the principles of the present disclosure.
Figure 5:
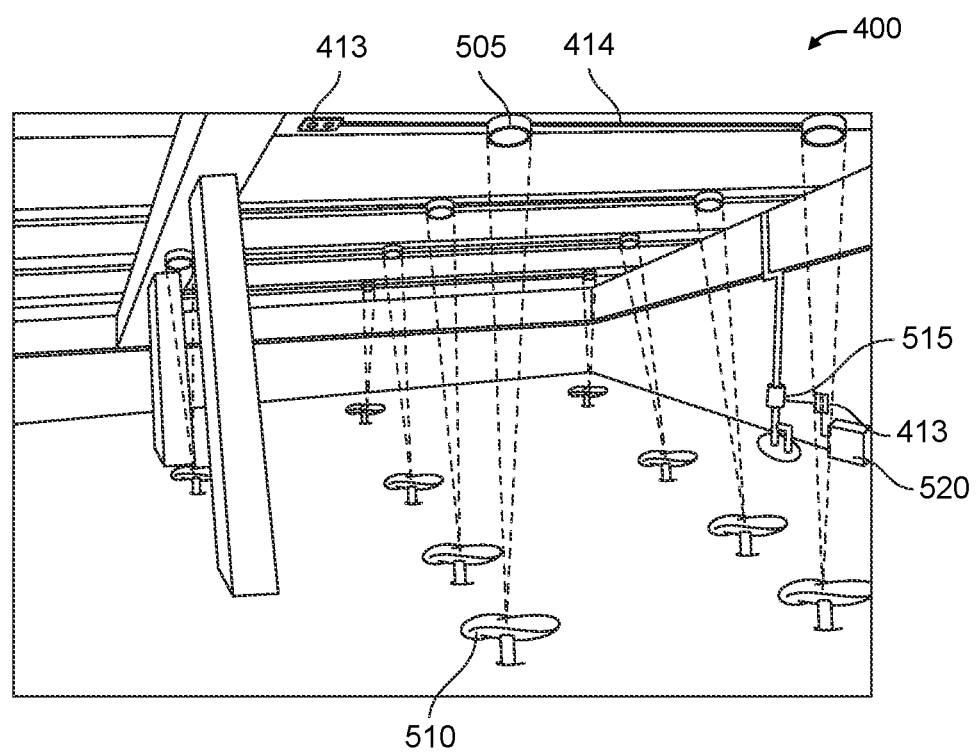
FIG. 5 is a diagram illustrating a system embodying features consistent with the principles of the present disclosure.
Figure 6:
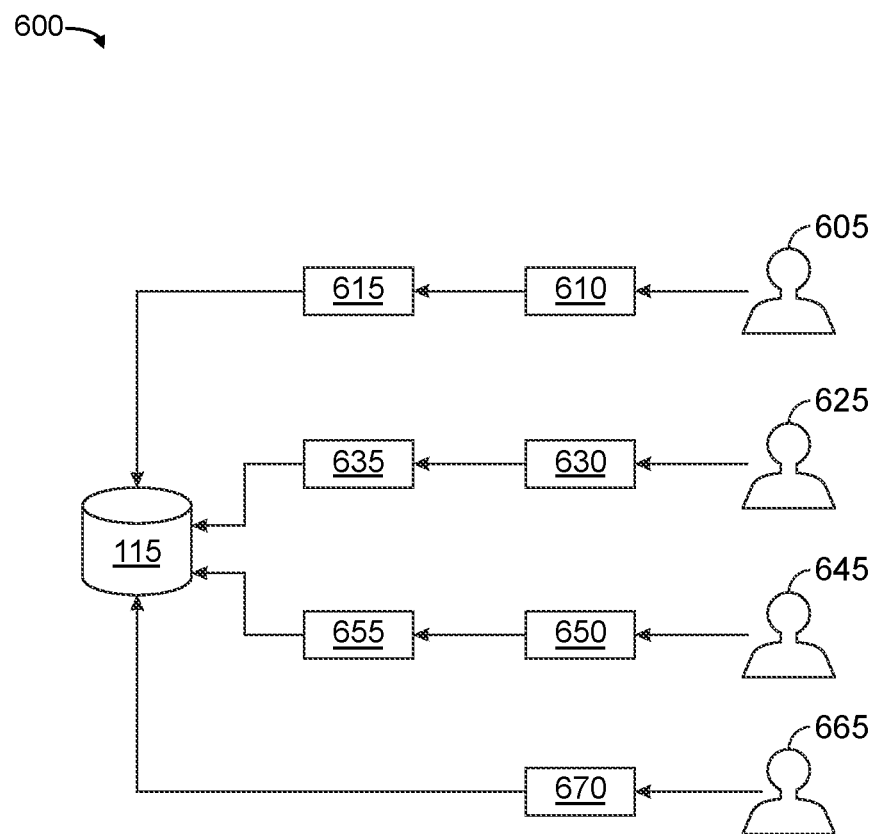
FIG. 6 is a diagram illustrating the manner in which individual access to data may be granted or limited based on permission levels.
Figure 7:
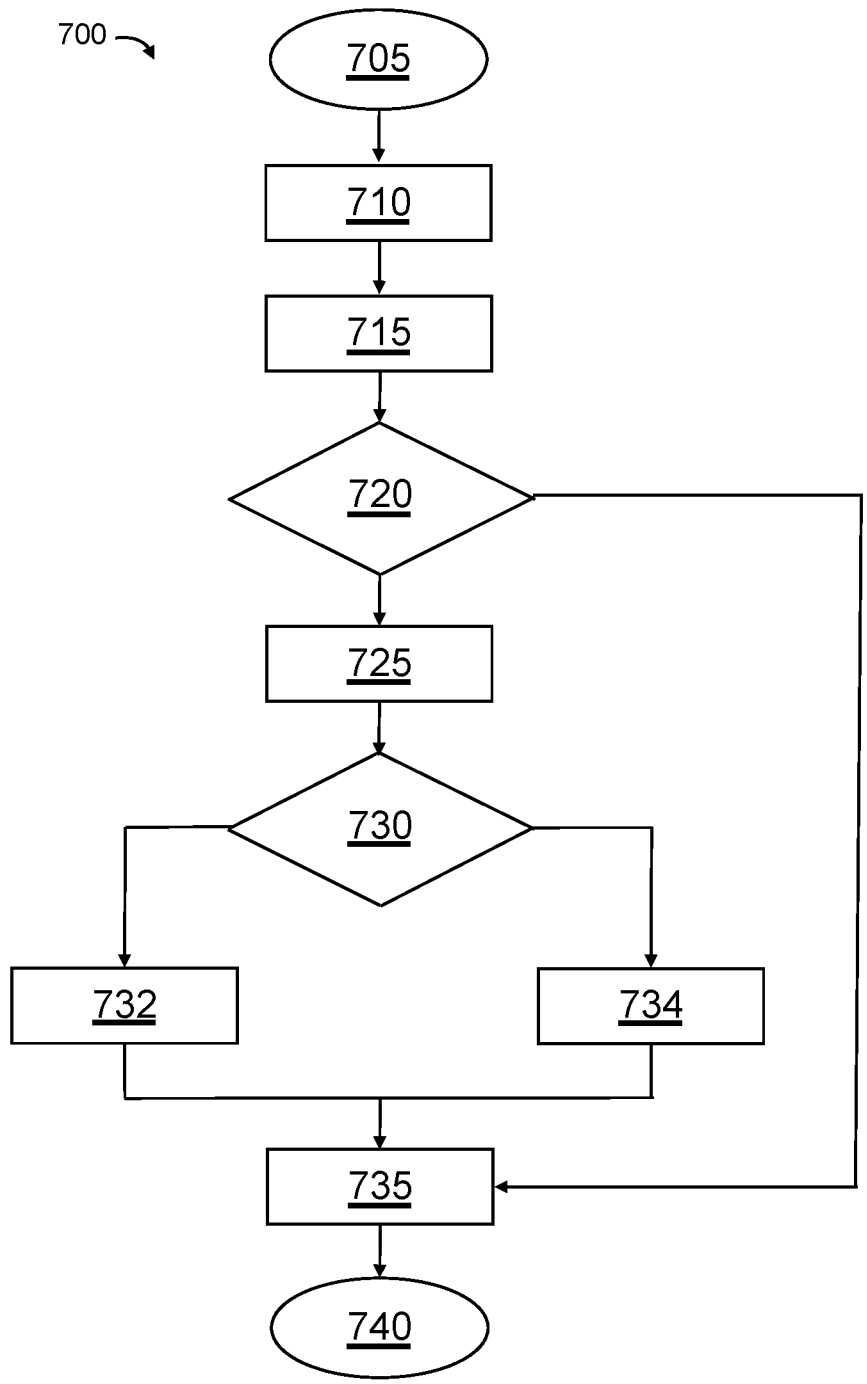
FIG. 7 is a flow chart illustrating certain method steps of a method embodying features consistent with the principles of the present disclosure.
Figure 8:
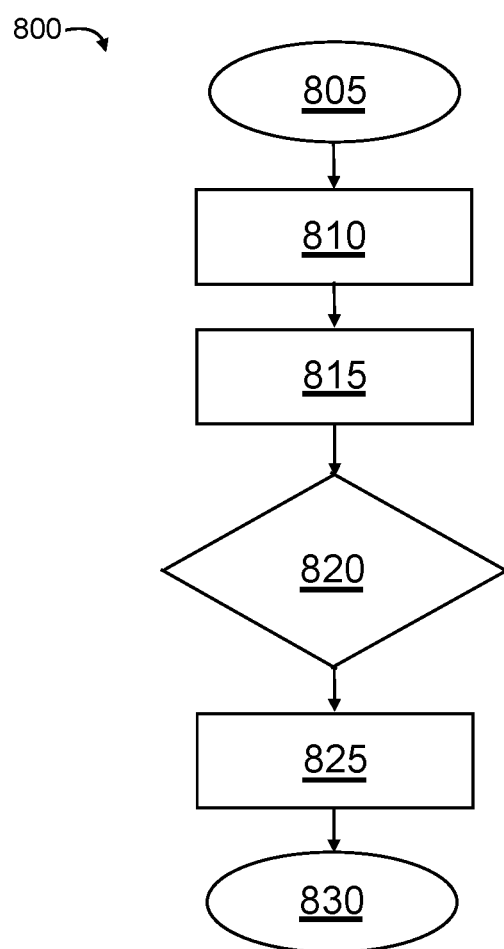
FIG. 8 is a flow chart illustrating certain method steps of a method embodying features consistent with the principles of the present disclosure.

A system 400 and methods 700, 800 for monitoring conditions within the non-main building expanse of a building is provided. Generally, the system 400 obtains condition data 430B from various sensors within the auxiliary building expanse and compares that condition data 430B to condition thresholds 430C of the system 400 in order to determine if a particular condition within the auxiliary building expanse is outside of an acceptable range. FIGS. 4-8 illustrate embodiments of a system 400 for monitoring conditions within an auxiliary building expanse. FIG. 4 depicts a preferred embodiment of a system 400 designed to collect condition data 430B. FIG. 5 illustrates a preferred embodiment of a system 400 arranged within a building's auxiliary building expanse 500. FIG. 6 illustrates permission levels 600 that may be utilized by the present system 400 for controlling access to building data 430A and condition data 430B. FIGS. 7 and 8 illustrate various methods that may be carried out by the system 400. It is understood that the various method steps associated with the methods of the present disclosure may be carried out as operations by the system 400 depicted in FIG. 4.

As illustrated in FIG. 4, the system 400 generally comprises at least one sensor 412, computing entity 200, data aggregator 413 operably connected to the at least one sensor 412, processor 220 operably connected to the computing entity 200, power supply 520, and non-transitory computer-readable medium 416 coupled to the processor 220 and having instructions stored thereon. In one embodiment, the computing entity 200 may comprise a user interface 411 that may allow a user 405 to view data of the system 400 and/or cause the system 400 to perform an action via commands input by said user 405. In another embodiment, the system 400 may comprise a database 115 operably connected to the processor 220, which may be used to store building data 430A and condition data 430B therein. In yet another preferred embodiment, a server 110 may be operably connected to the database 115 and processor 220, facilitating the transfer of information between the processor 220 and database 115. The system 400 preferably collects condition data 430B of an auxiliary building expanse and saves it within building profiles 430 so that a user 405 may monitor the conditions within said auxiliary building expanse. In particular, the system 400 is designed to monitor settling of a building over that may result in significant structural damage if the cause of said settling is not corrected.

The at least one sensor 412 may be secured within the auxiliary building expanse in a way such that it may measure conditions of the auxiliary building expanse and transmit condition data 430B to the processor 220. A condition may be defined as an aspect of the physical environment within the auxiliary building expanse, and condition data 430B may be defined as data reflecting the state of a particular condition at a given time. Types of condition that may be measured by the system 400, include, but are not limited to, temperature, humidity level, parts per million of a particular gas, sound, vibrations, movement, settling, standing water levels, or any combination thereof. Types of sensors that may be used as an at least one sensor 412 include, but are not limited to, thermometer, hygrometer, gas detector, microphone, vibration sensor, current sensor, ultrasonic sensor, infrared sensor, microwave sensor, photoelectric sensor, time-of-flight sensor 505, or any combination thereof. For instance, a system 400 comprising an at least one sensor 412 comprising a hygrometer, thermometer, and time-of-flight sensor 505 may collect humidity data, temperature data, and distance data and transmit that data to the processor 220. For instance, a system 400 comprising an at least one sensor 412 comprising a gas sensor, current sensor, and microwave sensor may collect radon gas data, sump pump data, and movement data and transmit that data to the processor 220. For instance, a system 400 comprising an at least one sensor 412 comprising a vibration sensor and microphone may measure vibration data and sound data and transmit that data to the processor 220 to determine the presence of termites or other pests. Therefore, the at least one sensor 412 may measure a variety of types of condition data 430B and transmit that data to the processor 220.

Alternatively, the system 400 may receive data from an at least one sensor 412 connected to the data aggregator 413 or the computing entity 200. In an embodiment, types of sensors that may be connected to the data aggregator 413 or the computing entity 200 may include, but are not limited to, thermometer, hygrometer, gas detector, microphone, vibration sensor, current sensor, ultrasonic sensor, infrared sensor, microwave sensor, photoelectric sensor, time-of-flight sensor 505, or any combination thereof. The processor 220 may be operably connected to the data aggregator 413 and/or the computing entity 200 in a way such that information may be transmitted to the processor 220 from the at least one sensor 412 connected to the data aggregator 413 or the computing entity 200. The processor 220 may then use this information to perform the various functions of the system 400. For instance, a computing entity 200 operably connected to the processor 220 may allow the processor 220 to receive data from the computing entity 200, process said data, and assign indicia to various indicators within a user interface 411 of the computing entity 200 in order to alert a user 405 of an unfavorable condition. In another preferred embodiment, an alarm system 400 may be operably connected to the data aggregator 413 or the computing entity 200. For instance, a computing entity 200 operably connected to the processor 220 may allow the processor 220 to trigger an alarm system 400 connected to the computing entity 200 in order to alert a user 405 of an unfavorable condition.

The data aggregator 413 may be operably connected to the processor 220 and/or at least one sensor 412 via wired or wireless connection. In one preferred embodiment, data may be transmitted wirelessly between an at least one sensor 412 and the data aggregator 413 while a wired connection is used to transfer data between the data aggregator 413 and processor 220. For instance, an at least one sensor 412 having a Bluetooth device may transmit condition data 430B to the data aggregator 413, wherein the data aggregator 413 may transmit the condition data 430B to the processor 220 via a bus. In another preferred embodiment, at least one communication bus 414 may facilitate the transfer of data between the at least one sensor 412 and data aggregator 413 and/or the at least one sensor 412 and processor 220. In one preferred embodiment, the communication bus 414 may comprise fiber optic cable and at least one bus splitter. The at least one bus splitter may be used to connect multiple at least one sensors 412 to a single commination bus. For instance, a plurality of bus splitters may split the fiber optic cable of a communication bus 414 in a way such that a current sensor operably connected to a sump pump 515, float switch, microwave motion sensor, and direct time-of-flight sensor 505 may all be connected to a single communication bus 414, which may transmit all of the data to the data aggregator 413. In a preferred embodiment, multiple bus splitters may be daisy chained together to create a bus network, which may transmit data received from the at least one sensors 412 connected to the bus network to the data aggregator 413.

In a preferred embodiment, as illustrated in FIG. 5, the system 400 comprises a time-of-flight sensor 505 having a reflective material 510. Types of time-of-flight sensors 505 that may be used by the system 400 include, but is not limited to, direct, indirect, and gated time-of-flight sensors 505, or any combination thereof. Direct time-of-flight sensors 505 work by determining the amount of time for a single laser pulse to leave the sensor and reflect back onto the focal plane array. Indirect time-of-flight sensors 505 work by illuminating a reflective material 510 with a modulated light source and then measuring the phase shift between the illumination and reflection to determine a distance. Gated time-of-flight sensors 505 work by causing a shutter to close at the same time a pulse of light is emitted. By measuring the amount of light received by the amount sent out, the distance the light travels can be determined. The distance determined be the time-of-flight sensor 505 may be used to determine the settling of a building, depending on the positioning of the time-of-flight sensor 505 and reflective material 510 within the crawl space. The time-of-flight sensor 505 is preferably attached to a beam within the crawl space and angled in a way such that any light emitted from the illumination cone of the time-of-flight sensor 505 may be received by the view cone of the time-of-flight sensor 505. The reflective material 510 is preferably made from a material that has non-specular reflective properties. For instance, a piece of wood with a matte paint coating wood has diffuse reflective properties. For instance, clear standing water has specular reflective properties.

In another preferred embodiment, the reflective material 510 is secured to the ground within the crawl space in a way such that the building moves over time relative the reflective material 510 while the reflective material 510 remains in the same position. In one preferred embodiment, the reflective material 510 is attached to a spike that is driven into the ground at a great enough distance that prevents the reflective material 510 from shifting position. As the building settles over time, the time-of-flight sensor 505 will move with the building since it is attached to a beam within the crawl space; however, the reflective material 510 should remain in the same position since it is not secured directly to the building. This may allow the system 400 to determine the change in distance between the time-of-flight sensor 505 and the reflective material 510, which may allow the system 400 to determine how much a building has settled over time. In another preferred embodiment, the system 400 may comprise multiple time-of-flight sensors 505 attached at various points within the crawl space to measure settling in different areas of a building. For instance, a building may have four time-of-flight sensors 505 measuring settling data at various locations within the crawl space to determine uneven settling of a building.

In addition to a system 400 comprising a time-of-flight sensor 505 having a reflective material 510, FIG. 5 also illustrates a system 400 comprising a sump pump 515 connected to the data aggregator 413. The data aggregator 413 is configured to transmit data to the computing entity 200 received from the various components of the system 400. In a preferred embodiment, an electrical current sensor of the data aggregator 413 may allow the system 400 to determine when the sump pump 515 pulls power from the data aggregator 413, which is then relayed to the computing entity 200. This may allow a user 405 to determine when the sump pump 515 is on. The system may also determine when the sump pump is malfunctioning based on the amount of current pulled from the data aggregator. For instance, a sump pump 515 pumping water will pull more current than a sump pump 515 that is dry running. In another embodiment, the sump pump 515 contains a water level sensor or float switch that allows system 400 to determine the amount of standing water within an auxiliary building expanse. This water level data may then be transmitted to the processor 220 and/or computing entity 200. As the water level changes, the system 400 may determine how much water the sump pump 515 has removed from the auxiliary building expanse over time.

In one preferred embodiment, the system 400 may use water level data and sump pump data to determine when a sump pump 515 is malfunctioning. For instance, if the system 400 determines that the sump pump 515 is pulling current but not lowering the water level, the system 400 may alert the user 405 that the sump pump 515 within the auxiliary building expanse may have a clogged or frozen discharge line or a jammed float switch. In another preferred embodiment, the system 400 may comprise multiple water sensors that may be used to determine water level within an auxiliary building expanse, which may further clarify whether or not a sump pump 515 is functioning properly. For instance, if a float switch were to jam and cause the sump pump 515 to run continuously, a plurality of water sensors may indicate that the water level is lowering despite the float switch saying otherwise, thus clarifying that the issue with the sump pump 515 is a jammed float switch.

Types of water sensors that may be used by the system 400 include, but are not limited to, magnetic float, conductive, pneumatic, and magneto-restrictive, or any combination thereof. In a preferred embodiment, a plurality of conductive water sensors may be linked together to create a water sensor chain. The water sensor chain may then give an estimate of how high water is in an auxiliary building expanse based on total resistance of the chain. For instance, nine conductive water sensors may be linked together at approximately three-inch intervals, thus creating a water sensor chain of approximately two feet. The water sensor chain may then be placed in an area of an auxiliary building expanse that experiences changes in water levels. If the system 400 determines the circuit is completed for only the lowest conductive water sensor (based on the total measured resistance), the system 400 may determine the water level within the auxiliary building expanse is between 0-3 inches. If the system 400 determines that the circuit is complete for only the two lowest conductive water sensors (based on the total measured resistance), the system 400 may determine the water level within the auxiliary building expanse is between 3-6 inches. If the system 400 determines that the circuit is complete for only all of the conductive water sensors (based on the total measured resistance), the system 400 may determine the water level within the auxiliary building expanse is greater than two feet.

In an embodiment, the programming instructions responsible for the operations carried out by the processor 220 are stored on a non-transitory computer-readable medium 416 ("CRM"), which may be coupled to the server 110, as illustrated in FIG. 4. Alternatively, the programming instructions may be stored or included within the processor 220. Examples of non-transitory computer-readable mediums 416 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 416.

Once condition data 430B has been measured and transmitted to the processor 220, the condition data 430B may be saved within a building profile 430, which may be viewed within the user interface 411 of the system 400. In a preferred embodiment, a building profile 430 contains building data 430A and condition data 430B. Building data 430A may be defined as information that characterizes the building. Types of data that the system 400 may use as building data 430A include, but are not limited to, geolocation data, building name, building address, auxiliary building expanse descriptions, or any combination thereof. Once saved in the building profile 430, the system 400 may compare the condition data 430B to condition thresholds 430C of the system 400. A condition threshold 430C may be defined as the maximum/minimum value a particular category of condition data 430B may exist before triggering a warning within the system 400. In a preferred embodiment, condition thresholds 430C are stored within building profiles 430. Condition thresholds 430C may be automatically generated by the system 400 or input by a user 405 via the user interface 411. For instance, the system 400 may be configured to automatically set a condition threshold 430C for humidity at a maximum value of 65% relative humidity. If the system 400 determines that the relative humidity of the auxiliary building expanse is higher than 65%, the system 400 may alert the user 405 that the conditions within the auxiliary building expanse may be conducive for mold growth. For instance, a user 405 may set a condition threshold 430C for temperature to a minimum value of 32 degrees Fahrenheit via a user interface 411 of the computing entity 200. If the system 400 determines that the temperature within the auxiliary building expanse is lower than 32 degrees, the system 400 may alert the user 405 that the conditions within the auxiliary building expanse may be conducive for frozen pipes.

In an embodiment, the system 400 may further comprise a computing entity 200 operably connected to the processor 220. A computing entity 200 may be implemented in a number of different forms, including, but not limited to, servers 110, multipurpose computers, mobile computers, etc. For instance, a computing entity 200 may be implemented in a multipurpose computer that acts as a personal computer for a user 405, such as a laptop computer. For instance, components from a computing entity 200 may be combined in a way such that a mobile computing entity 200 is created, such as mobile phone. Additionally, a computing entity 200 may be made up of a single computer or multiple computers working together over a network. For instance, a computing entity 200 may be implemented as a single server 110 or as a group of servers 110 working together over and Local Area Network (LAN), such as a rack server 110 system 400. Computing devices 200 may communicate via a wired or wireless connection. For instance, wireless communication may occur using a Bluetooth, Wi-Fi, or other such wireless communication device.

In an embodiment, the system 400 may further comprise a user interface 411. A user interface 411 may be defined as a space where interactions between a user 405 and the system 400 may take place. In a preferred embodiment, the interactions may take place in a way such that a user 405 may control the operations of the system 400, and more specifically, allow a user 405 to monitor the conditions of an auxiliary building expanse. A user 405 may input instructions to control operations of the system 400 manually using an input device. For instance, a user 405 may choose to alter the conditions in which the sump pump 515 is activated by using an input device of the system 400, including, but not limited to, a keyboard, mouse, or touchscreen. A user interface 411 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 411 to the user 405 via a display 316 operably connected to the processor 220.

A display 316 may be defined as an output device that communicates data that may include, but is not limited to, visual, auditory, cutaneous, kinesthetic, olfactory, and gustatory, or any combination thereof. Information presented via a display 316 may be referred to as a soft copy of the information because the information exists electronically and is presented for a temporary period of time. Information stored on the non-transitory computer-readable medium 416 may be referred to as the hard copy of the information. For instance, a display 316 may present a soft copy of a visual representation of condition data 430B within an auxiliary building expanse via a liquid crystal display (LCD), wherein the hardcopy of the visual representation of condition data 430B within an auxiliary building expanse may be stored on a local hard drive. For instance, a display 316 may present a soft copy of audio information via a speaker, wherein the hard copy of the audio information is stored on a flash drive. For instance, a display 316 may present a soft copy of condition data 430B within an auxiliary building expanse, wherein the hard copy of the condition data 430B within an auxiliary building expanse is stored within a database 115. Displays 316 may include, but are not limited to, cathode ray tube monitors, LCD monitors, light emitting diode (LED) monitors, gas plasma monitors, screen readers, speech synthesizers, haptic suits, speakers, and scent generating devices, or any combination thereof, but is not limited to these devices.

In a preferred embodiment, users 405 may access condition data 430B via the user interface 411, which may be accomplished by causing the processor 220 to query the non-transitory computer-readable medium 416 and/or database 115. The non-transitory computer-readable medium 416 and/or database 115 may then transmit condition data 430B back to the processor 220, wherein the processor 220 may present it to a user 405 via a display 316. This information may be presented to the user 405 in a way such that the user 405 may quickly determine whether anything is amiss within the auxiliary building expanse. For instance, the system 400 may present the data in a chart showing the most current condition data 430B of the system 400. For instance, the system 400 may present the data in a graph showing the change in condition data 430B over time. In one preferred embodiment, the system 400 may use indicia to indicate whether a condition is within an acceptable threshold range. For instance, the system 400 may have a movement threshold of none within the auxiliary building expanse. Should the microwave sensor detect movement within the auxiliary building expanse, the system 400 may display an "rodent" indicia next to a pest indicator of the user interface 411 to indicate to the user 405 that there may be pests within the auxiliary building expanse. For instance, the system 400 may have a settling threshold of $\frac{1}{16}^{th}$ of an inch. Should the time-of-flight sensor 505 detect that it has moved more than $\frac{1}{16}^{th}$ of an inch, the system 400 may display an "X" indicia next to a foundation indicator of the user interface 411 to indicate to the user 405 that the home has settled more than what is considered acceptable. For instance, the system 400 may have a temperature threshold of 28 degrees Fahrenheit. Should the thermometer detect that the temperature has dropped below 28 degrees Fahrenheit, the system 400 may display an image of a frozen pipe next to a temperature indicator of the user interface 411 to indicate to the user 405 that the pipes might freeze without appropriate action.

As illustrated in FIG. 4, the system 400 may comprise a database 115 operably connected to the processor 220. The database 115 may be operably connected to the processor 220 via wired or wireless connection. In a preferred embodiment, the database 115 is configured to store condition data 430B therein. Condition data 430B may include, but is not limited to, temperature, humidity level, water level, sump pump 515 run time, settling change, or any combination thereof. The database 115 may be a relational database 115 such that the condition data 430B associated with each building profile 430 within the plurality of building profiles 430 may be stored, at least in part, in one or more tables. Alternatively, the database 115 may be an object database 115 such that condition data 430B associated with each building profile 430 within the plurality of building profiles 430 are stored, at least in part, as objects. In some instances, the database 115 may comprise a relational and/or object database 115 and a server 110 dedicated solely to managing the condition data 430B in the manners disclosed herein.

To prevent un-authorized users 405 from accessing all data within the building profiles 430 of the system 400, the system 400 may employ a security method. As illustrated in FIG. 6, the security method of the system 400 may comprise a plurality of permission levels 600 that may allow a user 405 to view content 615, 635, 655 within the database 115 while simultaneously denying users 405 without appropriate permission levels 600 the ability to view said content 615, 635, 655. To access the data stored within the database 115, users 405 may be required to make a request via a user interface 411. Access to the data within the database 115 may be granted or denied by the processor 220 based on verification of a requesting user's 605, 625, 645 permission level 600. If the requesting user's 605, 625, 645 permission level 600 is sufficient, the processor 220 may provide the requesting user 605, 625, 645 access to content 615, 635, 655 stored within the system 400. Conversely, if the requesting user's 605, 625, 645 permission level 600 is insufficient, the processor 220 may deny the requesting user 605, 625, 645 access to content 615, 635, 655 stored within the system 400. In an embodiment, permission levels 600 may be based on user roles 610, 630, and administrator roles 670, as illustrated in FIG. 6. User roles 610, 630, 650 allow users to access content 615, 635, 655 that a user 405 has uploaded and/or otherwise obtained through use of the system 400. Administrator roles 670 allow administrators 665 to access system 400 wide data, including managerial permissions, as well as assign new tasks to other users 405.

In an embodiment, user roles 610, 630, 650 may be assigned to a user 405 in a way such that a requesting user 605, 625, 645 may access building profiles 430 containing condition data 430B via a user interface 411. To access the data within the database 115, a user 405 may make a user 405 request via the user interface 411 to the processor 220. In an embodiment, the processor 220 may grant or deny the request based on the permission level 600 associated with the requesting user 605, 625, 645. Only users 405 having appropriate user roles 610, 630, 650 or administrator roles 670 may access the content 615, 635, 655. For instance, as illustrated in FIG. 6, requesting user 1 has permission to view user 1 content 615 whereas requesting 2 has permission to view user 1 content 615, user 2 content 635, and user 3 content 655. Alternatively, content 615, 635, 655 may be restricted in a way such that a user 405 may only view a limited amount of content 615, 635, 655. For instance, requesting user 3 may be granted a permission level 600 that only allows them to view user 3 content 655 related to a particular condition of the building. Therefore, the permission levels 600 of the system 400 may be assigned to users 405 in various ways without departing from the inventive subject matter described herein.

FIG. 7 provides a flow chart 700 illustrating certain, preferred method steps that may be used to carry out the method of generating and displaying indicia to a user 405 for a particular condition of the auxiliary building expanse. Step 705 indicates the beginning of the method. During step 710, the processor 220 may receive condition data 430B from the at least one sensor 412 of the system 400. In a preferred embodiment, the system 400 may comprise multiple sensors that measure various conditions of an auxiliary building expanse. Once the system 400 has received the condition data 430B, the system 400 may perform a query to determine if there are any condition thresholds 430C relevant to the received condition data 430B during step 715. The system 400 may perform an action based on the results of the query during step 720. If the system 400 determines that there are no relevant condition thresholds 430C, the system 400 may proceed to step 735. If the system 400 determines that there is a relevant threshold limit, the system 400 may proceed to step 725, wherein the system 400 may perform a query to determine whether the condition data 430B violates any condition threshold 430C.

The system 400 may perform an action based on the results of the query during step 730. If the system 400 determines that no condition threshold 430C has been violated by the condition data 430B, the system 400 may assign a "within limits" indicia during step 732. If the system 400 determines that a condition has been violated by the condition data 430B, the system 400 may assign a "outside limits" indicia during step 734. Once indicia have been assigned by the processor 220, the system 400 may proceed to step 735, wherein the system 400 may present the data to the user 405 via a display 316. In a preferred embodiment, the data is presented to the user 405 by way of a user interface 411. In one preferred embodiment, the system 400 may ask the user 405 if they would like the system 400 to perform an action. For instance, the system 400 may ask if the user 405 would like to shut off the sump pump 515 remotely. Once the data has been presented to the user 405, the system 400 may proceed to the terminate method step 740.

FIG. 8 provides a flow chart 800 illustrating certain, preferred method steps that may be used to carry out the method for alerting a user 405 that an action should be taken within the auxiliary building expanse. Step 805 indicates the beginning of the method. During step 810, the processor 220 may receive condition data 430B from the at least one sensor 412 of the system 400. The system 400 may then perform a query to determine whether a condition threshold 430C has been violated by the condition data 430B during step 815. Based on the results of the query, the system 400 may perform an action during step 820. In one preferred embodiment, a calibration step may be used to determine original conditions of an auxiliary building expanse, which may be used as starting condition data 430B from which the system 400 to determine changes that may then be compared to the threshold limits. If the system 400 determines that a condition threshold 430C has not been violated, the processor 220 may proceed to terminate method step 830. If the system 400 determines that a condition threshold 430C has been violated, the processor 220 may activate an alarm system 400 of the system 400 during step 825. Once the alarm system 400 has been activated, the system 400 may proceed to terminate method step 830.

In one preferred embodiment of a system 400 comprising a sump pump 515, the processor 220 may also perform a query to determine if the sump pump 515 is active. Depending on the results of the query, the processor 220 may take an action in the next step. If the sump pump 515 is not active, the processor 220 may proceed to the terminate method step. If the sump pump 515 is active, the processor 220 may perform a query to determine if the water level is being lowered. If the water level is being lowered, the processor 220 may proceed to the terminate method step. If the water level is not lowering, the processor 220 may activate the alarm system 400 of the system 400. Once the alarm system 400 has been activated, the processor 220 may proceed to terminate method step.

In another preferred embodiment of a system 400 comprising a float switch operably connected to a sump pump 515 and a water sensor, the system 400 may determine if the sump pump 515 is malfunctioning and how the sump pump 515 is malfunctioning. The processor 220 may perform a query to determine if the sump pump 515 is active. Depending on the results of the query, the processor 220 may take an action in the next step. If the sump pump 515 is not active, the processor 220 may proceed to the terminate method step. If the sump pump 515 is active, the processor 220 may perform a query to determine if the float switch is indicating that the water level is lowering. If the float switch does indicate that the water level is lowering, the processor 220 may proceed to the terminate method step. If the float switch does not indicate that the water level is lowering, the processor 220 may perform a query to determine if the sump pump 515 is stuck using data from the water sensor. Depending on the results of the query, the processor 220 may take an action in the next step. If the water sensor indicates that the water level is not lowering, the processor 220 may send a computer readable signal to the user 405 that would indicate to the user 405 that the sump pump 515 is malfunctioning. If the water sensor indicates that the water level is lowering, the processor 220 may send a computer readable signal to the user 405 that would indicate to the user 405 that the float switch is malfunctioning. Once the system 400 has sent the computer readable signal to the user 405, the processor 220 may proceed to terminate method step.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for monitoring conditions within a building, the system comprising:
    multiple sensors for measuring condition data within a building, wherein the multiple sensors at least comprise multiple time-of-flight sensors positioned opposite one or more reflective materials, wherein the condition data is distance data between the multiple time-of-flight sensors and the one or more reflective materials, and wherein the multiple time-of-flight sensors are used to determine settling of the building;
    one or more processors;
    one or more non-transitory computer-readable mediums operatively coupled to the one or more processors and having instructions stored thereon, which when executed cause the one or more processors to:
        receive the condition data from the multiple sensors; and
        transmitting a computer readable signal regarding the condition data to a user computer system.

2. The system of claim 1, wherein the time-of-flight sensors comprise direct, indirect, or gated time-of-flight sensors.

3. The system of claim 1, wherein the multiple sensors further comprise one or more additional time-of-flight sensors for measuring a water level within the building.

4. The system of claim 1, wherein the multiple time-of-flight sensors are secured to one or more beams and the one or more reflective materials are secured to the ground within a crawl space within a building.

5. The system of claim 1, wherein the multiple sensors further comprise:
    a current sensor for a sump pump, wherein the condition data is current data for the sump pump, and wherein the current sensor is used to determine if the sump pump is dry running.

6. The system of claim 1, wherein the multiple sensors further comprise:
    a water level sensor or float switch sensor, wherein the condition data is a water level, a change in the water level, or an estimated water height.

7. The system of claim 1, wherein the multiple sensors further comprise multiple water level sensors that form a water sensor chain in order to provide an estimated water height.

8. The system of claim 1, wherein the multiple sensors further comprise multiple water level sensors in order to measure a water level, a change in water level, or an estimated water height in multiple locations.

9. The system of claim 1, wherein the multiple sensors further comprise a movement sensor, and the condition data is movement for detecting pests.

10. The system of claim 1, wherein the multiple sensors further comprise a temperature sensor for detecting a temperature.

11. The system of claim 1, wherein the multiple sensors further comprise a humidity sensor for detecting humidity.

12. The system of claim 1, wherein the multiple sensors further comprise a gas detector, a microphone sensor, a vibration sensor, an ultrasonic sensor, an infrared sensor, a microwave sensor, or a photoelectric sensor.

13. The system of claim 1, wherein the instructions when executed further cause the one or more processors to:
    determine whether the condition data is outside of one or more condition thresholds for at least one of the multiple sensors; and
    transmit the computer readable signal to the user computer system when the condition data is outside of the one or more condition thresholds.

14. A system for monitoring conditions within a building, the system comprising:
    a plurality of sensors for measuring condition data within the building, the plurality of sensors comprising:
        a distance sensor for measuring the condition data, wherein the distance sensor is a time-of-flight sensor positioned opposite a reflective material, wherein the condition data is distance data between the time-of-flight sensor and the reflective material, and wherein the time-of-flight sensor is used to determine settling of the building;
        a current sensor of a sump pump for measuring the condition data, wherein the condition data is current data for the sump pump;
        a water level sensor or float switch sensor, wherein the condition data is a water level, a change in the water level, or an estimated water height; and
        a movement sensor, wherein the condition data is movement data for detecting pests;
    one or more processors;
    one or more non-transitory computer-readable mediums coupled to the one or more processors and having instructions stored thereon, which when executed cause the one or more processors to:
        receive the condition data from the plurality of sensors; and
        transmit one or more computer readable signals regarding the condition data to a user computer system.

15. The system of claim 14, wherein the time-of-flight sensor comprises a direct, an indirect, or a gated time-of-flight sensor.

16. The system of claim 14, wherein the plurality of sensors further comprise a temperature sensor for detecting a temperature.

17. The system of claim 14, wherein the plurality of sensors further comprise a humidity sensor for detecting humidity.

18. The system of claim 14, wherein the plurality of sensors further comprise a gas detector, a microphone sensor, a vibration sensor, an ultrasonic sensor, an infrared sensor, a microwave sensor, or a photoelectric sensor.

19. The system of claim 14, wherein the instructions when executed further cause the one or more processors to:
   determine whether the condition data is outside of one or more condition thresholds for the plurality of sensors; and
   transmit one or more computer readable signals to the user computer system when the condition data is outside of the one or more condition thresholds.

20. A method of monitoring a building through multiple sensors, the method comprising:
   receiving, via one or more processors, condition data from the multiple sensors, wherein the multiple sensors at least comprise multiple time-of-flight sensors positioned opposite one or more reflective materials, wherein the condition data is distance data between the multiple time-of-flight sensors and the one or more reflective materials, and wherein the multiple time-of-flight sensors are used to determine settling of the building; and
   transmitting, via the one or more processors, a computer readable signal regarding the condition data to a user computer system.

* * * * *